US005099477A

United States Patent [19]

Taniguchi et al.

[11] Patent Number: 5,099,477

[45] Date of Patent: Mar. 24, 1992

[54] PHASE MATCHING CIRCUIT

[75] Inventors: Atsuki Taniguchi, Kawasaki; Haruo Yamashita, Yokohama; Tomohiro Ishihara, Hachioji; Takaaki Wakisaka, Nishiwaki, all of Japan

[73] Assignee: Fujitsu Limited, Kawasaki, Japan

[21] Appl. No.: 554,361

[22] Filed: Jul. 19, 1990

[30] Foreign Application Priority Data

Jul. 21, 1989 [JP] Japan ................................ 1-189597

[51] Int. Cl.[5] ................................................ H04J 3/06

[52] U.S. Cl. ...................................... 370/97; 328/155; 375/3; 375/118

[58] Field of Search .................. 375/3, 4, 51, 57, 106, 375/108, 118, 119; 328/55, 56, 72, 155; 370/75, 97; 455/601

[56] References Cited

U.S. PATENT DOCUMENTS

| | | | |
|---|---|---|---|
| 4,346,472 | 8/1982 | Ohkoshi et al. | 375/57 |
| 4,806,934 | 2/1989 | Magoon | 328/155 |
| 4,942,310 | 7/1990 | Renggli et al. | 328/155 |

*Primary Examiner*—Benedict V. Safourek
*Attorney, Agent, or Firm*—Staas & Halsey

[57] ABSTRACT

A phase matching circuit for realizing accurate data transmission and reception through phase shift control only during a data invalid region. The phase matching circuit includes an input buffer for taking first data with a first clock; an output buffer sending second data with a second clock; a phase detector for comparing the phases of first and second clocks and detecting a phase difference within a predetermined value; a phase control unit for directly outputting the first data to the output buffer when the phase difference within the predetermined value is not detected or for outputting the first data phase shifted to the output buffer, and for converting the first data synchronized with the first clock to the second data of the same content as the first data synchronized with the second clock in the same frequency as the first clock; an invalid data region detector for detecting an invalid region of first data; and a phase shifter controller for inhibiting phase shift control in the phase control unit when the invalid data region detector does not detect the invalid region and for allowing phase shift control in the phase control unit when the invalid data region detector detects the invalid region.

19 Claims, 6 Drawing Sheets

FIG. 2A
FIG. 2B
FIG. 2C
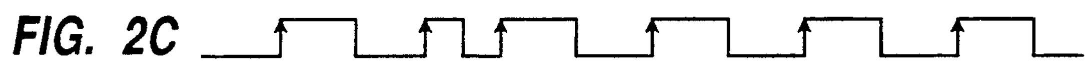
FIG. 2D
FIG. 2E
FIG. 2F
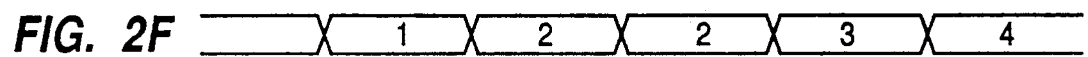
FIG. 3A
FIG. 3B
FIG. 3C
FIG. 3D
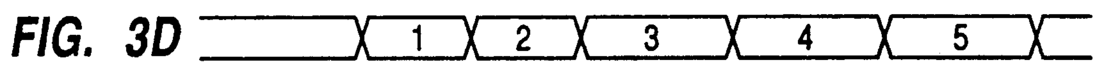
FIG. 3E
FIG. 3F
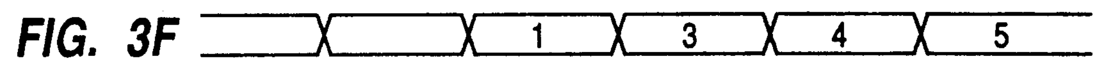

D1
CK1
210
INPUT BUFFER
216
PHASE CONTROL UNIT
224
INTERMEDIATE BUFFER
226
PHASE INVERTER AND NORMALIZER
218
OUTPUT BUFFER
D2
CK2
212
222
PHASE SHIFT CONTROL UNIT
220
PHASE DETECTION UNIT
PHASE DETECTION AND INHIBIT UNIT
214
UNUSED DATA REGION DETECTION UNIT

316 PHASE CONTROLLER
D2
CK2
G
318
D Q
C
E
F
324
D Q
C
326 EXOR
D
328
DELAY CIRCUIT
A
322
D Q
C
C
320
D Q
C
B
314
D Q
C
A
310
D Q
C
D1
CK1

D1
CK1
310
D Q
C
322
GATE CIRCUIT
314
D Q
C
320
D Q
C
316 PHASE CONTROLLER
328
DELAY CIRCUIT
326 EXOR
324
D Q
C
318
D Q
C
D2
CK2

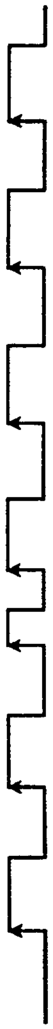
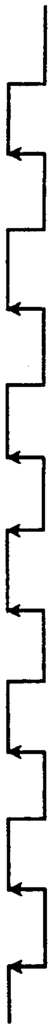
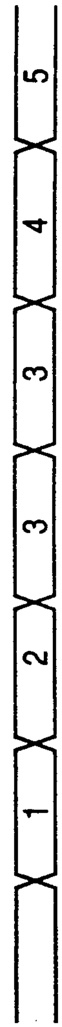
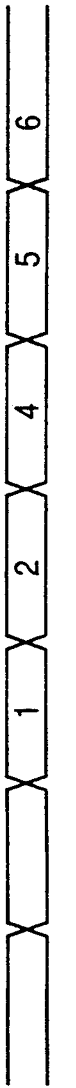
FIG. 7A FIG. 7B FIG. 7C FIG. 7D FIG. 7E FIG. 7F FIG. 7G
FIG. 8A FIG. 8B FIG. 8C FIG. 8D FIG. 8E FIG. 8F FIG. 8G

PHASE MATCHING CIRCUIT

BACKGROUND OF THE INVENTION a. Field of the Invention

The present invention relates to a phase matching circuit for receiving first data synchronized with a first clock and outputting second data of the same content as the first data synchronized with a second clock which has the same frequency as the first clock, and more particularly to a phase matching circuit suitable for changing the clock from the receiving clock to a system clock at a terminal repeater in a synchronous multiplex transmission system for transmitting a signal having used and unused data regions.

b. Description of the Related Art

In an apparatus for high speed transmission of signals which multiplex a voice signal and an image signal, the transmitter and receiver are operated synchronously. In this case, a phase matching circuit is provided within a terminal repeater connecting respective units in order to match the phase of the clocks of the respective units for the purpose of changing the clocks in the adequate timing during transfer of clocks between the units. However, although the prior art includes such a phase matching circuit, it has generated a problem in that accurate processing cannot be carried out in the receiving apparatus because valid data which are read in the receiving side apparatus are missed or such valid data are read twice due to the matching of the clocks using the phase matching circuit associated with the prior art.

An example of the structure of a known phase matching circuit is shown in FIG. 1. CK1 denotes a first clock used in the transmitting side apparatus, while D1 denotes first data output from the transmitting side apparatus. CK2 denotes a second clock used in the receiving side apparatus, while D2 denotes second data input to the receiving side apparatus. The first data D1 and second data D2 have the same content, and the first clock and second clock have the same frequency.

Reference numeral 101 denotes an input buffer which takes the first data D1 from the transmitting apparatus in accordance with the first clock CK1 used in the transmitting apparatus, 102 denotes an output buffer which sends the second data D2 of the same content as the first data D1 to the receiving apparatus in accordance with the second clock CK2 used in the receiving apparatus, 103 denotes a phase detector which inputs and compares the phases of the first clock CK1 and the second clock CK2 and determines whether the phase difference between the two clocks is within a predetermined value, and 104 denotes a phase controller which controls the timing for punching the first data D1 which is input in accordance with the second clock CK2 either directly or inverted based on the detection result of the phase detector 103.

In the phase matching circuit shown in FIG. 1, the first data D1 is taken by the first clock CK1 from the transmitting apparatus. The phase detector 103 receives the first clock CK1 and the second clock CK2 and detects whether a phase difference is within the predetermined value or not. Detection of the phase difference is necessary because if the first clock CK1 and the second clock CK2 have the same phase, then there is a high probability that when data is taken the content of receiving data will be changing in the receiving apparatus. Thus, accurate data reading is not possible. Therefore, when two clocks come close to the same phase, this problem occurs. This problem has been solved by shifting the phase of the first data D1 with a phase matching circuit.

The phase controller 104, which consists of an intermediate buffer 105 and a clock switch 106, receives the second clock CK2 and either inverts the second clock CK2 or uses it directly, depending on whether the phase difference between the first clock CK1 and the second clock CK2 is within the predetermined value or not. That is, the clock switch 106 causes data to be read from the intermediate buffer 105 with a clock, which is either the second clock CK2 directly or the second clock CK2 inverted depending on the phase difference detected by the phase detector 103. When the second clock CK2 is inverted due to such phase shift control, the inverted second clock is thereafter inverted again or normalized to the second clock CK2 when the phase difference is no longer within the predetermined value. As a result, phase shift control is carried out for the data being transmitted. However, the phase matching circuit associated with the prior art discussed above results in the following problems.

FIGS. 2A–2F and FIGS. 3A–3F illustrate timing charts for the phase matching circuit associated with the prior art. Designations A–F shown in FIG. 1 correspond to the timing charts of FIGS. 2A–2F and of FIGS. 3A–3F, respectively. FIGS. 2A–2F indicate that when the phase detector 103 detects the phase difference to be within the predetermined value, the phase of the second clock CK2 is shifted by inverting the second clock CK2 in the clock switch 106. FIGS. 3A–3F indicate that when the phase difference exceeds the predetermined value after being within the predetermined value, the inverted second clock is inverted again or normalized to the normal phase of the second clock CK2 in the clock switch 106. These phase shift operations cause the phase of the data to shift. A problem of such phase shift control, however, is that data are missed or read twice, as shown in FIGS. 2F and 3F. That is, the phase matching circuit associated with the prior art carries out phase shift control without relation to the content of the data. As a result, the above-mentioned problem arises in that the valid data to be read in the receiving side is missed or read twice. Thus, accurate processing cannot be conducted in the receiving side.

SUMMARY OF THE INVENTION

It is therefore an object of the present invention to provide a phase matching circuit which realizes accurate data transmission and reception by performing phase shift control only during a valid region of the data. The resulting improved phase shift circuit utilizes the fact that the data includes a valid region which is read in the receiving apparatus and an invalid region which is not read in the receiving apparatus.

The present invention provides a phase matching circuit which includes an input buffer for taking first data with a first clock; an output buffer for sending second data with a second clock; a phase detector for comparing phases of the first and second clocks and detecting a phase difference within a predetermined value; and a phase control unit for outputting directly the first data input from the input buffer to the output buffer when the phase difference within the predetermined value is not detected or for outputting the first data input from the input buffer phase shifted when the phase difference within the predetermined value is detected, and converting the first data synchronized with the first clock into the second data synchronized with the second clock. Further, the present invention is provided with an unused data region detector for detecting an unused data region of the first data, and a phase shift controller for inhibiting phase shift control by the phase control unit when the unused data region is not detected by the unused data region detector and for allowing phase shift control by the phase control unit when the unused data region is detected by the unused data region detector.

BRIEF DESCRIPTION OF THE DRAWINGS

FIGS. 2A-2F and FIGS. 3A-3F are timing charts illustrating the operation of FIG. 1;

FIGS. 7A-7G and FIGS. 8A-8G are timing charts illustrating the operation of the phase matching circuit of the present invention.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The basic principal of the invention together with preferred embodiments of the present invention will be explained in detail below with reference to FIGS. 4-7.

Figure 1:
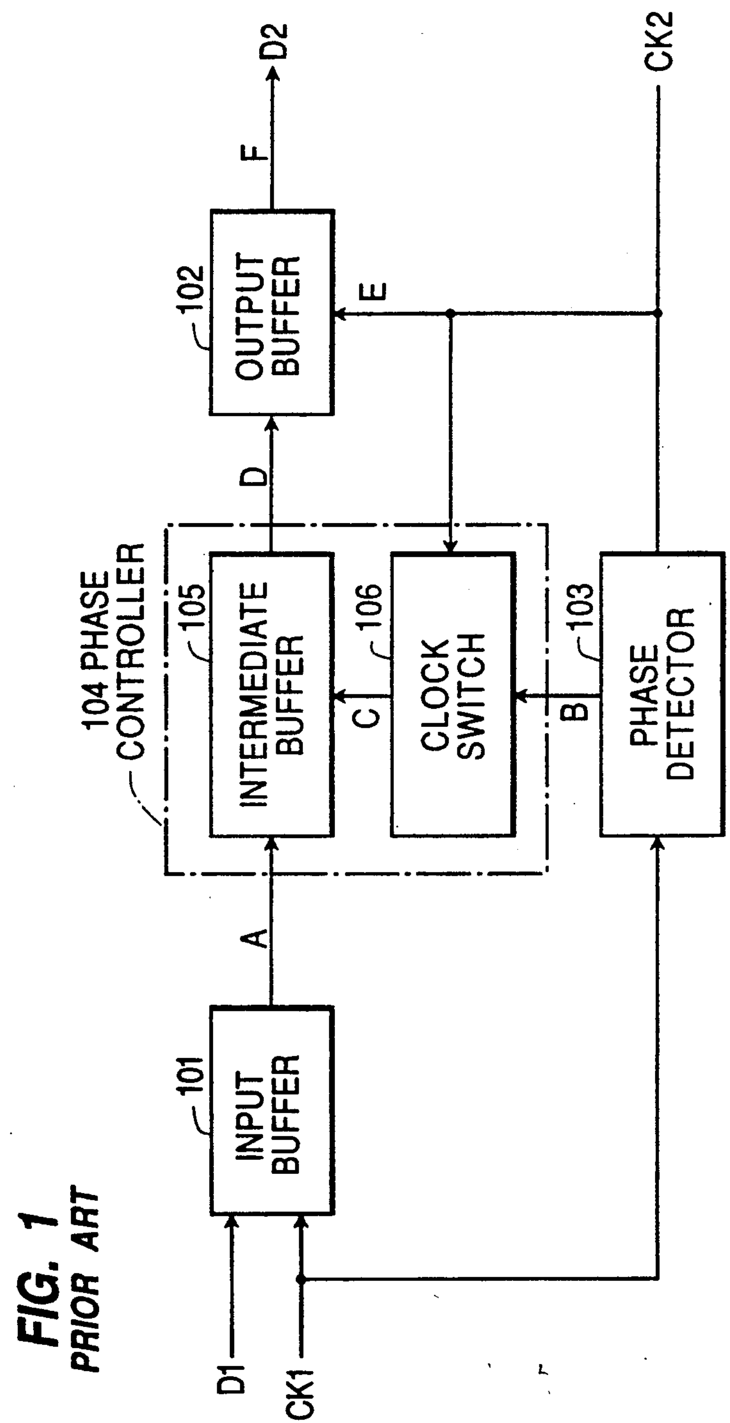
FIG. 1 is a block diagram illustrating a phase matching circuit of the prior art.
Figure 4:
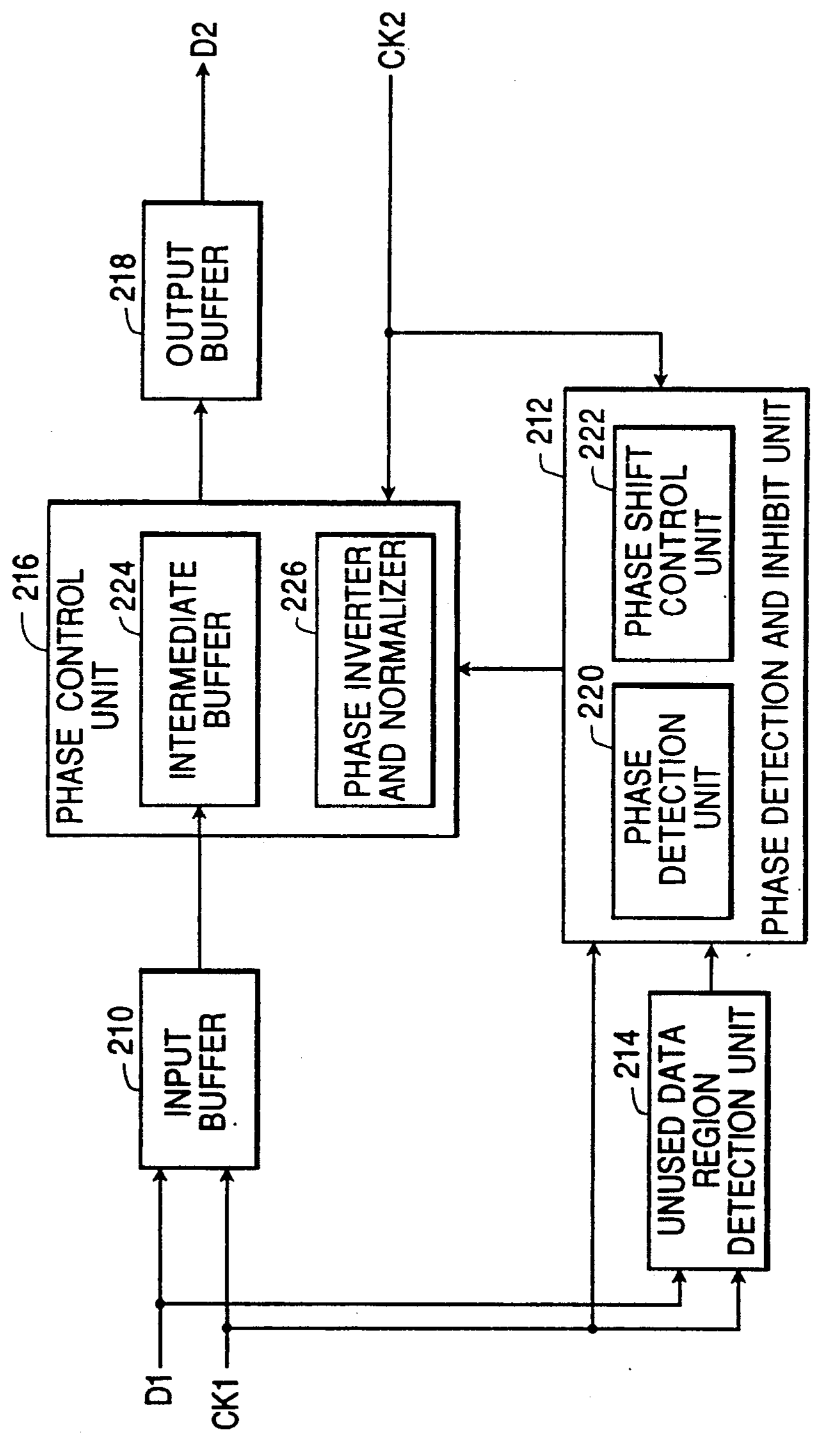
FIG. 4 is a block diagram illustrating the basic principal of the present invention.

The basic principle of the present invention is illustrated in FIG. 4. The present invention relates to phase matching circuit formed by an input buffer 210, a phase detection and inhibit unit 212, an unused data region and detection unit 214, a phase control unit 216, and an output buffer 218. The input buffer 210 receives input data as first data D1 and an input clock as a first clock CK1 from a transmitting apparatus. The first clock CK1 is sent to the phase detection and inhibit unit 212 and the unused data region detection unit 214. The output buffer 218 sends out output data as second data D2 to a receiving apparatus using a second clock CK2 provided by the receiving apparatus. The second clock CK2 is sent to the phase detection and inhibit unit 212 and the phase control unit 216.

Next, the phase detection and inhibit unit 212 compares the phase of the first clock CK1 with the phase of the second clock CK2 to determine if the phase difference is within a predetermined value. This operation is performed by a phase detection unit 220 which is included within the phase detection and inhibit unit 212. Meanwhile, the unused data region detection unit 214 determines whether the first data D1 is in an unused data region (invalid region) or an used data region (valid region). Then, the phase detection and inhibit unit 212 produces a phase inversion signal based upon the phase difference detected by the phase detection unit 220 and the detection of data regions by the unused data region detection unit 214.

More particularly, when the phase detection unit 220 detects the phase difference within the predetermined value the phase inversion signal is produced. However, the phase inversion signal is not output to the phase control unit 216 until an unused data region is detected by the unused data region detection unit 214. This gating or inhibiting operation is performed by a phase shift control unit 222 contained within the phase detection and inhibit unit 212.

Once the phase inversion signal is output from the phase detection and inhibit unit 212, the phase control unit 216 controls the phase shift operation. The phase control unit 216 includes an intermediate buffer 224 and a phase inverter and normalizer 226. The phase inverter and normalizer 226 receives the phase inversion signal and shifts or inverts the second clock CK2 when the phase inversion signal indicates that the phase difference is within the predetermined value. The phase inverter and normalizer 226 outputs an intermediate clock which corresponds to either the second clock CK2 directly or the second clock after having been shifted or inverted. The intermediate buffer 224 then receives the first data D1 in accordance with the intermediate clock, thus causing a shift in phase of the first data. Finally, the first data, whether shifted or not, is output by the output buffer 218.

Figure 5:
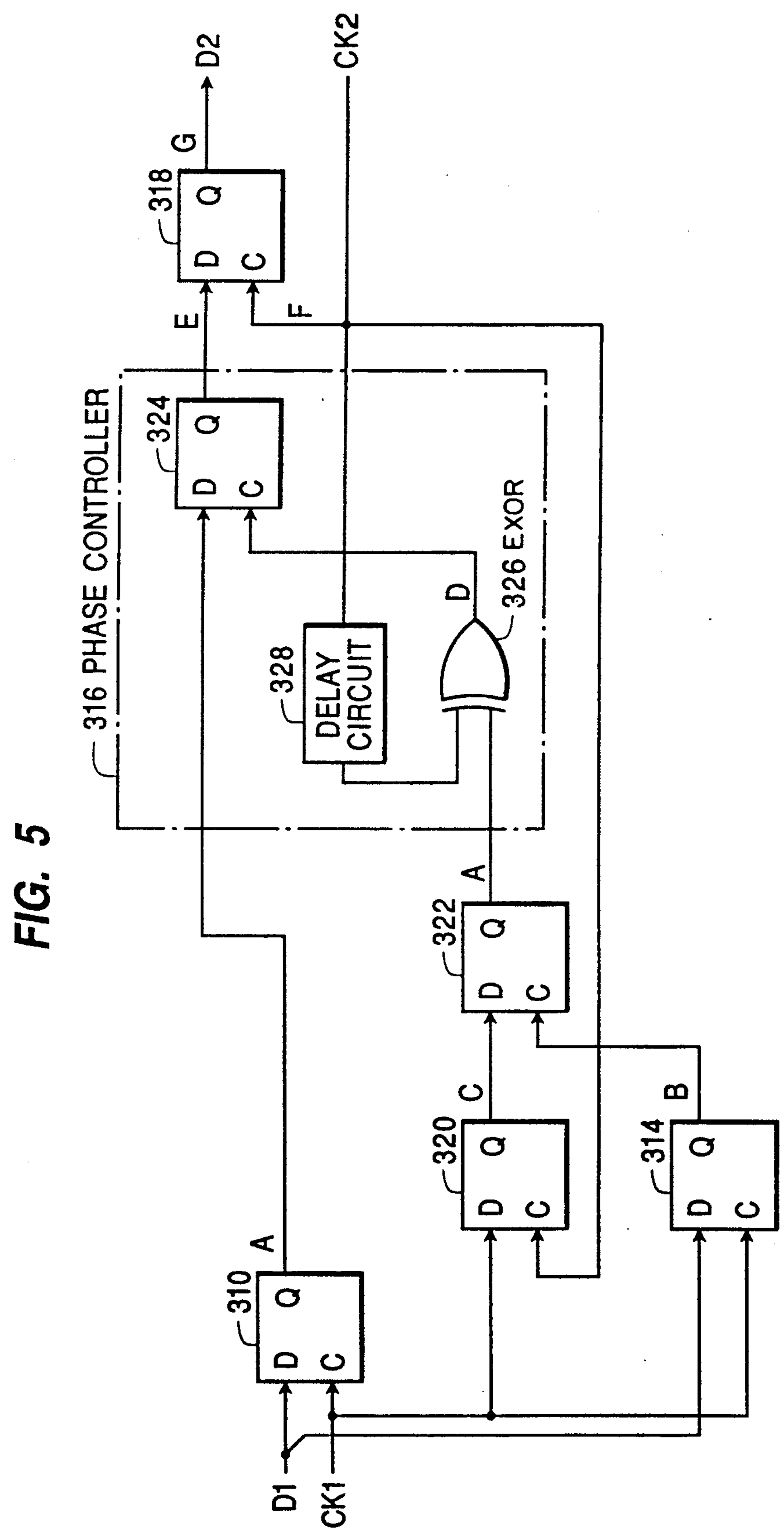
FIG. 5 is a block diagram illustrating a first embodiment of the phase matching circuit of the present invention.
Figure 6:
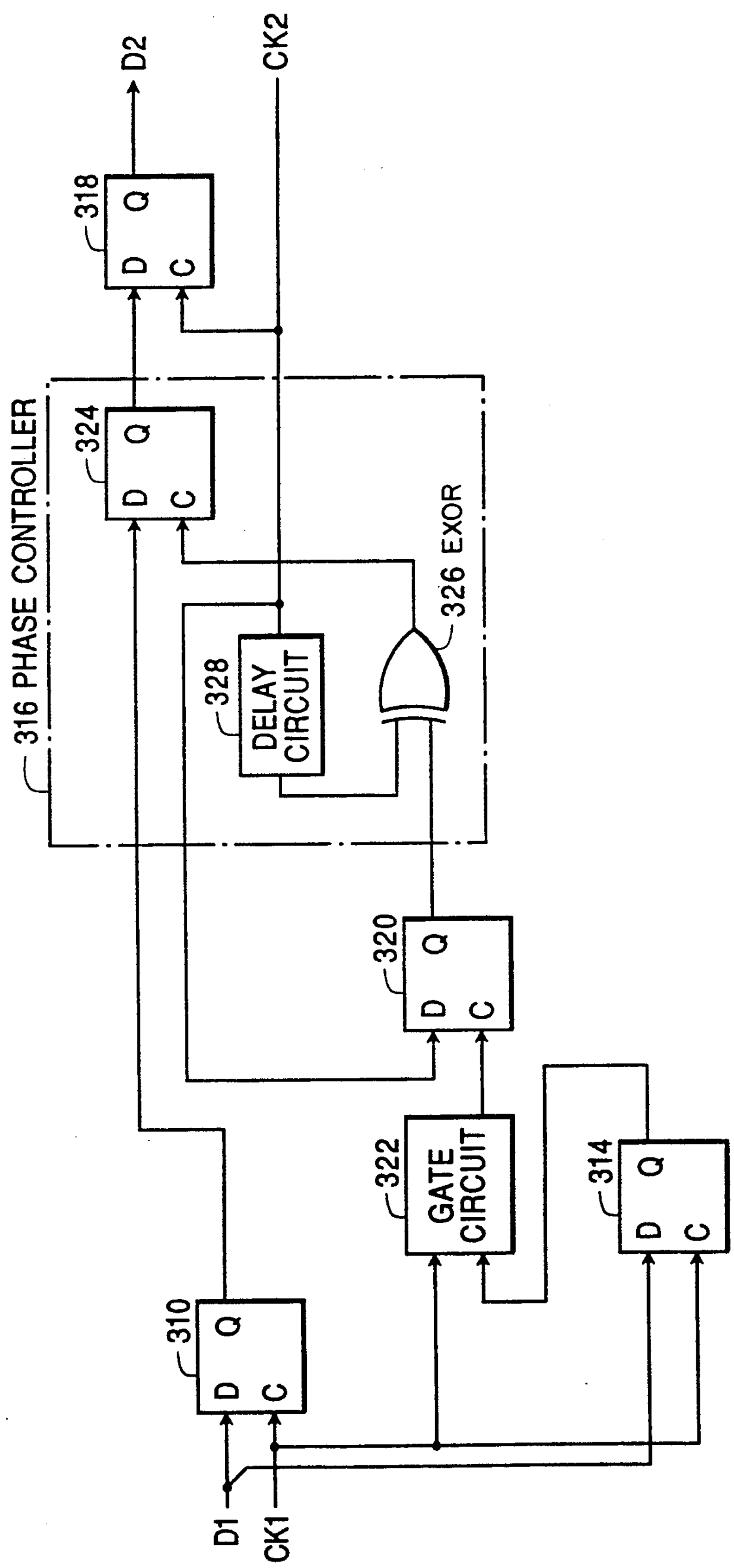
FIG. 6 is a block diagram illustrating a second embodiment of the phase matching circuit of the present invention.

FIG. 5 illustrates a first embodiment of the present invention. The first embodiment will be explained in detail with regard to FIG. 5.

The phase matching circuit of the first embodiment is formed by an input buffer 310, an unused data region detector 314, a phase controller 316, an output buffer 318, a phase detector 320, and a phase shift controller 322. The input buffer 310 receives the input data as the first data D1 and the input clock as the first clock CK1, and is formed by a D-type flip-flop. The output buffer 318 receives the second clock CK2 and outputs the output data as the second data D2, and is also formed by a D-type flip-flop. The output data has the same content as the input data, and the output clock has the same frequency as the input clock. Although invalid data may be lost or read twice, the consequence of such is harmless to the correct reception of the valid data.

The phase detector 320 detects whether the second clock CK2 has a phase difference from the phase of first clock CK1 that is within the predetermined value or not. The phase detector 320 can also be formed by a D-type flip-flop. The first clock CK1 is input to the data input (D input) and the second clock CK2 is input to the clock input (C input) of the D-type flip-flop 320. Therefore, the output of the D-type flip-flop 320 becomes "1" when the phase difference between the first clock CK1 and the second clock CK2 is within the predetermined value. In all other cases, the output of the D-type flip-flop 320 becomes "0".

The phase controller 316 applies the first data D1 either directly or phase shifted to the output buffer 2 depending on the result of the detecting by the phase detector 320. Therefore, the phase controller 316 includes a phase inverter and normalizer 326 which inverts or normalizes the second clock CK2 depending on the result of the detecting by the phase detector 320. The phase inverter and normalizer 326 corresponds to the clock switch 106 described above. The phase controller 316 also includes an intermediate buffer 324 and a delay circuit 328. The intermediate buffer 324 receives data output from the input buffer 310 and applies such data to the output buffer 318. As the intermediate buffer 41, a D-type flip-flop can be used like the input buffer 310 and output buffer 318.

The delay circuit 328 is provided to delay the second clock CK2 so that data can be accurately read in the intermediate buffer 324. The delay circuit 328 delays the second clock CK2 prior to its input to the phase inverter and normalizer 326. Note, however, that alternatively the delay circuit 328 could be located at the clock input (C input) of the output buffer 318. That is, the delay circuit 328 is provided so that the clock input to the intermediate buffer 324 and the clock input to the output buffer 318 are not in phase.

The phase inverter and normalizer 326 inverts the second clock CK2 when the phase detector 320 detects a phase difference within the predetermined value between the first clock CK1 and the second clock CK2. Alternatively, the phase inverter and normalizer 326 outputs the second clock CK2 in its normal phase when the phase detector 320 detects a phase difference greater than the predetermined value between the first clock CK1 and the second clock CK2. As the phase inverter and normalizer 326, an exclusive OR gate (EXOR gate) ca be used.

The unused data region detector 314 can also be formed by a D-type flip-flop. The unused data region detector 314 detects an unused data region using identification data contained in the first data D1. The identification data is, for example, binary data which is "1" for a used data region or "0" for an unused data region. The data input (D input) of D-type flip-flop 314 receives the identification data and the first clock CK1 is input to the clock input (C input) as shown in FIG. 5. The identification data is a signal which exists, for example, in the header of each frame of the first data D1 to indicate whether or not the data in the frame includes data to be read and used in the receiving apparatus. The circuit diagram of the first embodiment shown in FIG. 5 indicates an apparatus for processing only one bit in order to simplify the explanation.

The phase shift controller 322 inhibits phase shift control in the phase controller 316, even when a phase difference within the predetermined value is detected by the phase detector 320, until the unused data region detector 314 detects an unused data region in the first data D1. That is, the phase shift controller 322 allows phase shift control in the phase controller 324 only when the unused data region is detected and not when a used data region is detected. A D-type flip-flop can be used as the phase shift controller 322. The output from the phase detector 320 is input to the data input (D input) of D-type flip-flop forming the phase shift controller 322 and the output from the unused data region detector 314 is input to the clock input (C input) thereof.

The result detected by the phase detector 320 is maintained in the phase shift controller 322 until an unused data region is detected by the unused data region detector 314. Once an unused data region is detected, the data maintained is then applied to the phase inverter and normalizer 326 of the phase controller 316. When the unused data region detector 314 detects an unused data region, it causes the phase shift controller 322 to latch the output from the phase detector 320. Namely, the phase shift controller 322 is inserted between the phase detector 320 and the phase controller 316 so that the data input to the phase controller 316 is not altered until the unused data region is detected.

With the structure mentioned above, the first data D1 is applied to the output buffer 318 either directly or phase shifted depending on the detection result of the phase detector 320. However, if the unused data region detector 314 does not detect the unused data region of the input data D1, phase shift control in the phase shift controller 316 is inhibited by holding the detection result previously output from the phase detector 320 in the phase shift controller 322. Thereafter, phase shift control is allowed by latching the detection result currently output from the phase detector 320 when the unused data region detector 314 detects an unused data region of the first data D1.

The unused data region corresponds to an invalid region in an over-head area of a signal format consisting of the over-head area and a pay-load area in units of a byte, such as the signal format used in a synchronous optical network. The invalid region indicates the region is not currently defined as the particular control byte, although it may be defined in the future as control information. In such a network, the processing is carried out byte-by-byte and the processing for each bit as explained in the above-described embodiment is conducted in parallel for 8 bits. Namely, the header bit of each byte is the identification data and the other seven (7) bits are processed in parallel depending on the content of identification data.

The above-described phase control operation will be explained in more detail below with reference to the timing charts of FIGS. 7A–7G and FIGS. 8A–8G. Note, FIGS. 7G–7G and FIGS. 8A–8G take into consideration the differences of delays for each signal. Comparing FIG. 7 with FIG. 2 may facilitate the understanding of this control. In this embodiment, when a phase difference within the predetermined value is detected by the phase detector 320 (FIG. 6C) phase shift control for the first data D1 is carried out by inverting the second clock CK2 at EXOR 326 as shown in FIG. 6D. However, since data is used in the region (data used region), such control is not carried out. Nevertheless, phase shift control of the first data D1 is carried out by inverting clock CK2 at EXOR 326 when the unused data region is eventually detected ("0" region of FIG. 6B).

Moreover, FIG. 8 shows the timing charts when a phase difference exceeds the predetermined value after the phase control operation has been performed. The phase shift control operation is carried out by normalizing the second clock CK2 at EXOR 326 when an unused data region (region "0" of FIG. 7B) is detected by the unused data region detector 314. With such control, only the unused data region is missed or read twice in the receiving apparatus, and the data regions used in the receiving side are never missed. Thus, accurate processing may be carried out in the receiving apparatus.

In a synchronous multiplex transmission system, the unused data region is generated at a rate of about 1/30 of the used data region. Therefore, even when phase shift control of data is not carried out immediately after the phase difference within the predetermined value is detected, the phase shift of data is conducted after an unused data region occurs. Hence, the problem of reading the partitioning area of the data does not occur.

Next, a second embodiment of the present invention will be explained. The phase matching circuit of the second embodiment has the structure as shown in FIG.

6. For example, the phase matching circuit is provided within the terminal repeater. The second embodiment is different from the first embodiment in the structure and location of the phase shift controller 322, 422. Namely, a phase shift controller 422, of the second embodiment is formed as a gate circuit to control supply of the first clock CK1 to the clock input of the phase detector 320. For example, a NOR gate can be used as the gate circuit 422. This replaces the phase shift controller 322 of the first embodiment. The output from the unused data region detector 314 and the first clock CK1 are input to the gate circuit forming the phase shift controller 422. When the unused data region detector 314 detects an unused data region, the first clock CK1 is supplied to the phase detector 320.

Accordingly, even in the structure of the second embodiment, if the unused data region detector 314 does not detect an unused data region of the first data D1, phase shift control by the phase controller 316 is inhibited. On the other hand, when the unused data region detector 314 detects an unused data region of first data D1, phase shift control by the phase controller 316 is allowed. Consequently an effect similar to that of the first embodiment may also be obtained by the second embodiment.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A phase matching system for converting first data from a transmission system to second data for a reception system, the first data is synchronized with a first clock having a first phase and the second data is synchronized with a second clock having a second phase, the first data having used and unused data regions, said phase matching system comprising:

phase comparison means for determining a phase difference between the first phase of the first clock and the second phase of the second clock and comparing the phase difference with a predetermined value to produce a phase difference signal;

data detection means for detecting one of the used and unused data regions of the first data;

phase shift control means for converting the second clock into an intermediate clock, for inverting the intermediate clock to produce an inverted intermediate clock when the phase difference signal indicates the phase difference is less than the predetermined value and when said data detection means detects one of the unused data regions, and for outputting the first data in accordance with the intermediate clock when the inverted intermediate clock is not produced and the inverted intermediate clock when the inverted intermediate clock is produced.

2. A phase matching system as recited in claim 1, wherein said system further comprises:

input buffer means for receiving the first data with the first clock; and output buffer means for outputting the second data in accordance with the second clock.

3. A phase matching system as recited in claim 2, wherein said phase matching system is provided in a terminal repeater of a synchronous multiplex transmission system, and wherein the first data has a content the same as a content of the second data, and the first frequency equals the second frequency.

4. A phase matching system as recited in claim 2, wherein said phase shift control means comprises:

intermediate buffer means for receiving the first data from said input buffer means and for outputting the first data with one of the intermediate clock and the inverted intermediate clock;

phase shift inhibit means for inhibiting the inverting of the intermediate clock until said data detection means detects an unused data region; and phase inversion and normalization means for producing one of the intermediate clock and the inverted intermediate clock.

5. A phase matching system as recited in claim 2, wherein said phase shift control means further comprises delay means for delaying the second clock to produce the intermediate clock.

6. A phase matching circuit for converting first data synchronized with a first clock into second data, the second data having the same content as the first data and synchronized with a second clock having the same frequency as the first clock, said phase matching circuit comprising:

input buffer means for storing the first data with the second clock, the first data includes used and unused data regions;

output buffer means for sending the second data with the second clock;

phase detector means for comparing phases of the first and second clocks to detect at least one phase difference within a predetermined value;

phase control means, operatively connected to said input buffer means, said output buffer means and said phase detector means, for performing phase shift control by one of outputting directly the first data to said output buffer means when the phase difference within the predetermined value is not detected by said phase detector means, and outputting the first data phase shifted to said output buffer means when the phase difference within the predetermined value is detected by said phase detector means;

unused data region detector means for detecting one of the unused data regions within the first data; and phase shift controller means, operatively connected to said unused data region detector means, for inhibiting the phase shift control by said phase control means when said unused data region detector means does not detect one of the unused data regions and for allowing the phase shift control in said phase control means when said unused data regions detector means detects one of the unused data regions.

7. A phase matching circuit according to claim 6, wherein said phase matching circuit is provided in a synchronous optical network, wherein the first data has a synchronous optical network format including an over-head portion and a pay-load portion, and wherein the unused data regions are undefined regions in the over-head portion of the synchronous optical network format.

8. A phase matching circuit according to claim 6, wherein said phase shift controller means inhibits the phase shift control in said phase control means by inhibiting an output from said phase detector means to said phase control means when said unused data region detector means does not detect one of the unused data regions.

9. A phase matching circuit according to claim 8, wherein said phase shift controller means comprises a D-type flip-flop operatively connected to receive the output of said phase detector means at a data input and an output of said unused data region detector means at a clock input.

10. A phase matching circuit according to claim 8, wherein said phase control means comprises:

an exclusive OR gate, having a first input receiving the second clock and a second input receiving an output of said phase shift controller means, for producing an intermediate clock; and an intermediate buffer for sending the first data in the timing of the intermediate clock.

11. A phase matching circuit according to claim 10, wherein said phase control means further comprises delay means for delaying the second clock.

12. A phase matching circuit according to claim 6, wherein said phase shift controller means inhibits the phase shift control in said phase control means by inhibiting input of the first clock to said phase detector means when said unused data region detector means does not detect one of the unused data regions.

13. A phase matching circuit according to claim 12, wherein said phase shift controller means comprises a gate circuit, having a first input receiving the first clock and a second input receiving an output of said unused data region detector means, for inputting the first clock to said phase detector means when said unused data region detector means detects the unused data region.

14. A phase matching circuit according to claim 12, wherein said phase control means comprises:

an exclusive OR gate, having a first input receiving the second clock and a second input receiving an output of said phase detector means, for producing an intermediate clock; and an intermediate buffer for sending the first data in the timing of the intermediate clock.

15. A phase matching circuit according to claim 4, wherein said phase control means further comprises delay means for delaying the second clock.

16. A method for converting first data from a transmission system to second data for a reception system, the first data is synchronized with a first clock having a first phase and the second data is synchronized with the second clock having a second phase, the first data having used and unused data regions, said method comprising the steps of:

(a) receiving the first data, the first clock and the second clock;

(b) determining a phase difference between the first phase of the first clock and the second phase of the second clock;

(c) comparing the phase difference with a predetermined value;

(d) producing a phase difference signal based on said comparing in step (c);

(e) detecting one of the used and unused data regions in the first data;

(f) shifting the first data to produce shifted first data when the phase difference signal indicates the phase difference is less than the predetermined value and when said detecting in step (e) detects one of the unused data regions; and (h) outputting one of the first data and the shifted first data as the second data.

17. A method for converting first data from a transmission system to second data for a reception system, the first data is synchronized with a first clock having a first phase and the second data is synchronized with a second clock having a second phase, the first data having used and unused data regions, said method comprising the steps of:

(a) receiving the first data, the first clock and the second clock;

(b) determining a phase difference between the first phase of the first clock and the second phase of the second clock;

(c) comparing the phase difference with a predetermined value;

(d) producing a phase difference signal based on said comparing in step (c);

(e) detecting one of the used and unused data regions in the first data;

(f) converting the second clock into an intermediate clock;

(g) inverting the intermediate clock to produce an inverted intermediate clock when the phase difference signal indicates the phase difference is less than the predetermined value and when said detecting in step (e) detects one of the unused data regions;

(h) producing intermediate data from the first data in accordance with one of the intermediate clock when the inverted intermediate clock is not produced and the inverted intermediate clock when the inverted intermediate clock is produced in step (g); and (i) outputting the second data from the intermediate data in accordance with the second clock.

18. A method as recited in claim 17, wherein said method is performed by a terminal repeater of a synchronous multiplex transmission system, and wherein the first data corresponds to the second data, and the first frequency equals the second frequency.

19. A method as recited in claim 18, wherein said converting in step (f) comprises the step of delaying the second phase of the second clock to produce the intermediate clock.

* * * * *